US010504452B2

(12) United States Patent
Chappalli et al.

(10) Patent No.: US 10,504,452 B2
(45) Date of Patent: Dec. 10, 2019

(54) PIXEL CONTRAST CONTROL SYSTEMS AND METHODS

(71) Applicant: Apple Inc., Cupertino, CA (US)

(72) Inventors: Mahesh B. Chappalli, San Jose, CA (US); Changki Min, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1 day.

(21) Appl. No.: 15/918,879

(22) Filed: Mar. 12, 2018

(65) Prior Publication Data

US 2019/0279579 A1 Sep. 12, 2019

(51) Int. Cl.

| | |
|---|---|
| ***G06K 9/00*** | (2006.01) |
| ***G06T 5/40*** | (2006.01) |
| ***G09G 3/34*** | (2006.01) |
| ***G09G 3/36*** | (2006.01) |
| ***G09G 3/3233*** | (2016.01) |

(52) U.S. Cl.

CPC ......... *G09G 3/3406* (2013.01); *G09G 3/3233* (2013.01); *G09G 3/3648* (2013.01); *G09G 2320/066* (2013.01)

(58) Field of Classification Search

USPC .......................................................... 345/690

See application file for complete search history.

(56) References Cited

U.S. PATENT DOCUMENTS

| | | | |
|---|---|---|---|
| 9,055,227 | B2 | 6/2015 | Batur et al. |
| 9,183,812 | B2 | 11/2015 | Myers et al. |
| 9,514,682 | B2 | 12/2016 | Yang |
| 9,741,305 | B2 | 8/2017 | Jung et al. |
| 9,922,598 | B2 | 3/2018 | Park et al. |
| 10,134,106 | B2 | 11/2018 | Abarca et al. |

(Continued)

FOREIGN PATENT DOCUMENTS

| | | |
|---|---|---|
| KR | 10-2015-0047612 A | 5/2015 |
| KR | 10-2015-0114522 A | 10/2015 |

(Continued)

OTHER PUBLICATIONS

Korean Search Report (WIPS) for Korean Application No. 10-2019-7005140 dated Mar. 11, 2019; 11 pgs.

*Primary Examiner* — Deeprose Subedi

(74) *Attorney, Agent, or Firm* — Fletcher Yoder, P.C.

(57) ABSTRACT

An electronic device may include a display pipeline to be coupled between an image data source and a display panel. The display pipeline may include pixel contrast control processing circuitry programmed to determine pixel statistics indicative of an image frame based at least in part on image data that indicates an initial target luminance of a corresponding display pixel implemented on the display panel. The pixel contrast control circuitry may also apply a set of local tone maps to determine modified image data that indicates a modified target luminance. The display pipeline may also include a pixel contrast control controller coupled to the pixel contrast control processing circuitry. The pixel contrast control controller may be programmed to execute firmware instructions to determine local tone maps to be applied during the next image frame based at least in part on the pixels statistics determined by the pixel contrast control processing circuitry.

20 Claims, 10 Drawing Sheets

(56) References Cited

U.S. PATENT DOCUMENTS

| | | | | |
|---|---|---|---|---|
| 2010/0166301 | A1* | 7/2010 | Jeon | G06T 5/009 382/162 |
| 2012/0075353 | A1* | 3/2012 | Dong | H04N 5/58 345/690 |
| 2015/0356904 | A1* | 12/2015 | Nakatani | G09G 5/377 345/690 |
| 2016/0358584 | A1* | 12/2016 | Greenebaum | G09G 5/02 |
| 2017/0161882 | A1 | 6/2017 | Mantiuk et al. | |

FOREIGN PATENT DOCUMENTS

| | | | |
|---|---|---|---|
| KR | 10-2016-0034503 | A | 3/2016 |
| KR | 10-2016-0078749 | A | 7/2016 |

* cited by examiner

PIXEL CONTRAST CONTROL SYSTEMS AND METHODS

BACKGROUND

The present disclosure relates generally to electronic displays and, more specifically, to processing image data to be used to display images on an electronic display.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual representations of information as text, still images, and/or video by displaying one or more images (e.g., image frames). For example, such electronic devices may include computers, mobile phones, portable media devices, tablets, televisions, virtual-reality headsets, and vehicle dashboards, among many others. To display an image, an electronic display may control light emission (e.g., luminance) of its display pixels based at least in part on corresponding image data. Generally, luminance of display pixels while displaying an image may affect perceived brightness and, thus, perceived contrast (e.g., brightness difference between display pixels) in the image. In fact, at least in some instances, increasing contrast may facilitate improving image sharpness and, thus, perceived image quality.

However, environmental factors, such as ambient lighting conditions, may affect perceived contrast. For example, ambient light incident on the screen of an electronic display may increase perceived brightness of dark display pixels relative to perceived brightness of bright pixels. As such, increasing ambient light may reduce perceived contrast in an image, which, at least in some instances, may result in the image appearing washed out.

To facilitate improving perceived contrast, in some instances, luminance of bright display pixels may be further increased relative to luminance of dark display pixels, for example, to counteract ambient lighting conditions. However, luminance increases in an electronic display may nevertheless be limited by maximum brightness of its light source (e.g., LED backlight or OLED display pixels). Moreover, increasing luminance of its display pixels may increase power consumption resulting from operation of an electronic display.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Accordingly, to facilitate improving perceived image quality and/or reducing power consumption, the present disclosure provides techniques for implementing and operating a pixel contrast control (PCC) block in a display pipeline, for example, coupled between an image data source and a display panel of an electronic display. In some embodiments, the pixel contrast control block may include processing circuitry (e.g., hardware) that modifies image data to adjust resulting color hue and/or luminance in a manner expected to facilitate improving perceived contrast. For example, to modify an image pixel, the pixel contrast control processing circuitry may determine pixel position of the image pixel and apply, to the image pixel, one or more local tone maps each associated with a corresponding pixel position. When multiple (e.g., four nearest) local tone maps are applied, in some embodiments, the pixel contrast control processing circuitry may interpolate the results based at least in part on distance between the pixel position of the image pixel and the pixel positions associated with the local tone maps.

Additionally, to facilitate improving perceived contrast, in some instances, the luminance of bright display pixels may be increased or altered relative to luminance of dark display pixels, for example, to counteract ambient lighting conditions. For example, an electronic display may increase luminance of its display pixels by increasing electrical power supplied to a light source, such a backlight implemented adjacent the display pixels and/or organic light-emitting diodes (OLEDs) implemented in the display pixels.

In some embodiments, the pixel contrast control processing circuitry may determine pixel statistics, which may be indicative of the pixel luminance and color hues of the image. The pixel statistics may, thus, be used to determine the local tone maps. In some embodiments, the pixel statistics may be gathered based on local windows (e.g., cells) defined in a current image frame. Additionally, the pixel contrast control processing circuitry may determine global pixel statistics based on an active region defined in the current image frame. The active region may exclude static portions of a current image frame, such as subtitles. In some embodiments, the pixel statistics may include the maximum color component values, average values, histograms, and/or luma values of each image pixel in the active region.

In some embodiments, the luma value associated with an image pixel may be determined based at least in part on a target brightness level. For example, the luma value corresponding with an image pixel may be set as an average luma value (e.g., weighted average of color components), a maximum luma value (e.g., maximum of weighted color components), and/or a mixed luma value. In some embodiments, the mixed luma value may be determined by mixing the average luma value and the maximum luma value, for example, to produce a smooth transition therebetween.

The pixel contrast control block may additionally include a controller (e.g., processor) that executes instructions (e.g., firmware) to determine one or more local tone maps based at least in part on detected environmental conditions and the pixel statistics received from the pixel contrast control processing circuitry. In some embodiments, the pixel statistics and the local tone maps may be determined in parallel. However, in some embodiments, operating in parallel may result in local tone maps determined based on pixel statistics from a previous frame. Thus, in such embodiments, the pixel contrast control controller may determine local tone maps based at least in part on pixel statistics associated with the current image frame while the pixel contrast control processing circuitry applies local tone maps that are determined based at least in part on pixel statistics associated with a previous image frame.

In some embodiments, a set of local tone maps may be spatially and/or temporally filtered to facilitate reducing likelihood of producing unintended sudden brightness changes in an image frame. However, in some embodiments, temporal filtering of successive sets of local tone maps may be disabled when a scene change is detected. In some embodiments, a scene change may be determined from the pixel statistics associated with each local window and/or the entire active region.

To enable such an implementation, the pixel contrast control controller may determine multiple versions of each local tone map. For example, the pixel contrast control controller may determine a first version with temporal filtering enabled and a second version with temporal filtering disabled. In this manner, the pixel contrast control processing circuitry may selectively apply either the first version of the local tone maps or the second version of the local tone maps based at least in part on whether a scene change has been detected.

Moreover, in some embodiments, the pixel contrast control controller may facilitate reducing power consumption by opportunistically dimming (e.g., reducing) the brightness of a backlight, if equipped. In some embodiments, the dimming factor applied to the backlight level may be temporally filtered (e.g., via a moving average) to facilitate reducing likelihood of producing sudden brightness changes. For example, target luminance of an image frame may be determined based on luminance of a previous image frame and a dimming ratio applied to image frames prior. In this manner, as will be described in more detail below, the techniques described in the present disclosure provide technical benefits that facilitate reducing power consumption and/or improving perceived image quality of electronic displays.

BRIEF DESCRIPTION OF THE DRAWINGS

Various aspects of this disclosure may be better understood upon reading the following detailed description and upon reference to the drawings in which.

DETAILED DESCRIPTION

Figure 1:
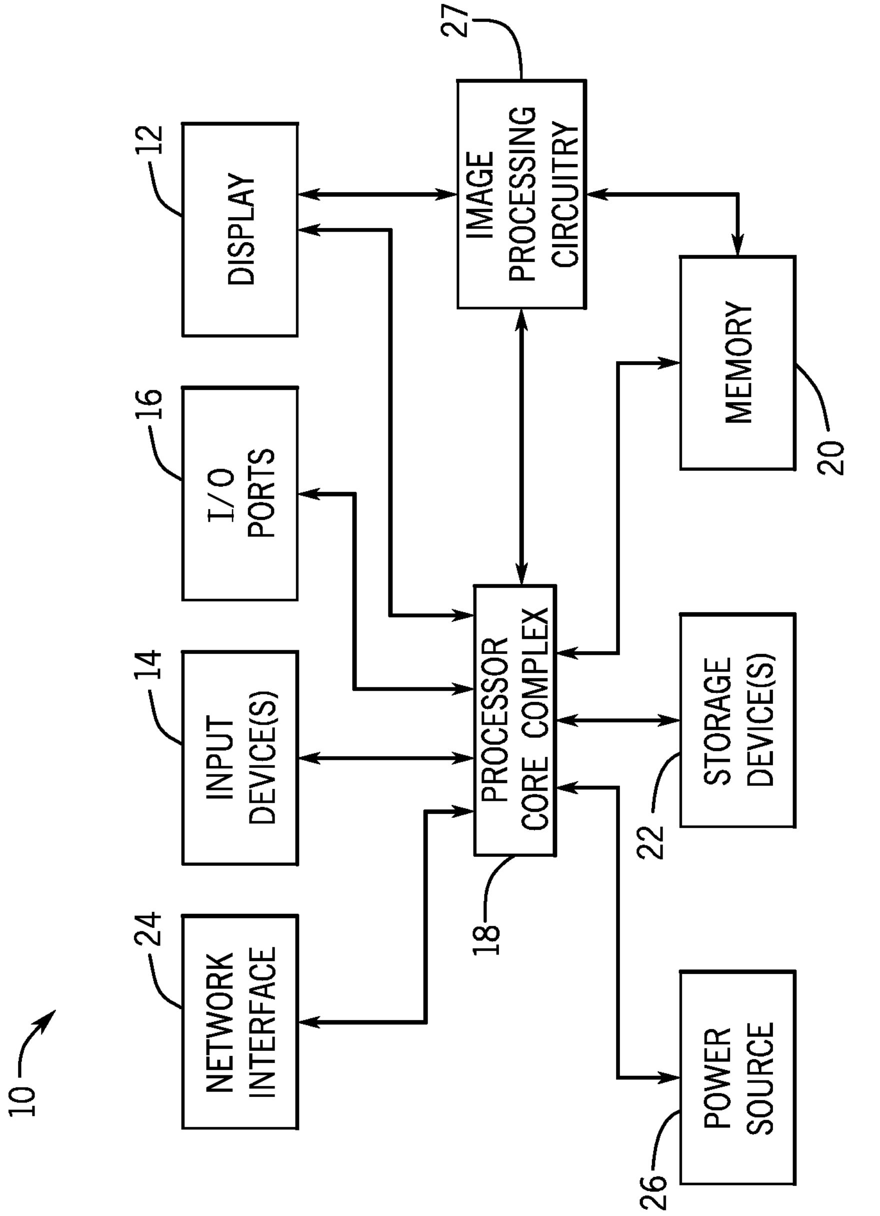
FIG. 1 is a block diagram of an electronic device that includes an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

To facilitate communicating information, electronic devices often use one or more electronic displays to present visual representations of the information via one or more images (e.g., image frames). Generally, to display an image, an electronic display may control light emission (e.g., luminance) of its display pixels based on corresponding image data. For example, an image data source (e.g., memory, an input/output (I/O) port, and/or a communication network) may output image data as a stream of image pixels, which each indicates target luminance of a display pixel located at a corresponding pixel position.

Generally, display pixel luminance may affect perceived brightness and, thus, perceived contrast in an image. At least in some instances, perceived contrast may affect perceived quality of a displayed image. For example, higher perceived contrast may improve edge and/or line sharpness (e.g., definition).

However, perceived contrast may also be affected by environmental factors, such as ambient lighting conditions. For example, brighter ambient lighting conditions may result in the difference between perceived brightness of dark display pixels in an image and perceived brightness of bright display pixels in the image decreasing, thereby decreasing perceived contrast in the image. In other words, using the same display pixel luminance, perceived contrast generally changes (e.g., decreases) as ambient lighting conditions change (e.g., increase).

To facilitate improving perceived contrast, in some instances, luminance of bright display pixels may be further increased relative to luminance of dark display pixels, for example, to counteract ambient lighting conditions. Generally, an electronic display may increase luminance of its display pixels by increasing electrical power supplied to a light source, such a backlight implemented adjacent the display pixels and/or organic light-emitting diodes (OLEDs) implemented in the display pixels. As such, increasing luminance of display pixels may also increase power consumption resulting from operation of an electronic display. Additionally, the maximum brightness of a light source may limit the ability of an electronic display to continually increase display pixel luminance.

Moreover, environmental condition changes often occur relatively suddenly, for example, due to the electronic display being moved from an indoor environment to an outdoor environment. Thus, at least in some instances, responsiveness to environmental condition changes may also affect perceived image quality. For example, adjusting target luminance of display pixels purely in software (e.g., out-of-loop) may result in a perceivable delay before an environmental condition change is accounted for.

Accordingly, to facilitate improving perceived image quality and/or reducing power consumption, the present disclosure provides techniques for implementing and operating a pixel contrast control (PCC) block in a display pipeline, for example, coupled between an image data source and a display panel of an electronic display. In some embodiments, the pixel contrast control block may include processing circuitry (e.g., hardware) that modifies image data to adjust resulting color hue and/or luminance in a manner expected to facilitate improving perceived contrast. For example, to modify an image pixel, the pixel contrast control processing circuitry may determine pixel position of the image pixel and apply, to the image pixel, one or more local tone maps each associated with a corresponding pixel position. When multiple (e.g., four nearest) local tone maps are applied, in some embodiments, the pixel contrast control processing circuitry may interpolate the results based at least in part on distance between the pixel position of the image pixel and the pixel positions associated with the local tone maps.

Since perceived contrast generally varies with display pixel luminance, in some embodiments, the pixel contrast control processing circuitry may determine pixel statistics, which may be indicative of image content and, thus, used to determine local tone maps. For example, the pixel contrast control processing circuitry may determine local pixel statistics based on local windows (e.g., cells) defined in a current image frame. Additionally, the pixel contrast control processing circuitry may determine global pixel statistics based on an active region defined in the current image frame.

To determine global pixel statistics, in some embodiments, the pixel contrast control processing circuitry may define an active region to exclude static portions of a current image frame, such as subtitles. In some embodiments, based on a maximum color component value of each image pixel in the active region, the pixel contrast control processing circuitry may determine a global maximum color component histogram associated with the current image frame. Additionally, based on a luma value associated with each image pixel in the active region, the pixel contrast control processing circuitry may determine a global luma histogram associated with the current image frame.

In some embodiments, the luma value associated with an image pixel may be determined based at least in part on a target brightness level. For example, the luma value corresponding with an image pixel may be set as an average luma value (e.g., weighted average of color components) when the target brightness level is below a lower threshold brightness level (e.g., dark to mid-level brightness), a maximum luma value (e.g., maximum of weighted color components) when the target brightness is above an upper threshold brightness level (e.g., high-end of brightness range), and a mixed luma value when the target brightness level is between the lower threshold brightness level and the upper threshold brightness level. In some embodiments, the mixed luma value may be determined by mixing the average luma value and the maximum luma value, for example, to produce a smooth transition therebetween.

To determine local pixel statistics, in some embodiments, the pixel contrast control processing circuitry may define one or more sets of local windows in the current image frame, for example, with a first set of local windows defined such that it encloses the active region and a second set of local windows defined such that it is enclosed within the active region. In some embodiments, based on the maximum color component value of each image pixel in a local window (e.g., of the second set), the pixel contrast control processing circuitry may determine the largest maximum color component value and an average maximum color component value associated with the local window. Additionally, based on the luma value associated with each image pixel in a local window (e.g., of the first set), the pixel contrast control processing circuitry may determine a local luma histogram associated with the local window.

In this manner, the pixel contrast control block may determine pixel statistics indicative of image content and modify image data in-loop, which, at least in some instances, may facilitate improving responsiveness to environmental condition changes, for example, due to the environmental conditions being considered closer to when images are actually displayed. However, processing duration allocated to the display pipeline and, thus, pixel contrast control processing circuitry is generally limited. To facilitate accounting for its limited allotted processing duration, in some embodiments, the pixel contrast control block may additionally include a controller (e.g., processor) that executes instructions (e.g., firmware) to determine one or more local tone maps based at least in part on detected environmental conditions and the pixel statistics received from the pixel contrast control processing circuitry.

In particular, implementing the pixel contrast control block in this manner may enable the pixel contrast control processing circuitry and the pixel contrast control controller to operate in parallel. However, in some embodiments, operating in parallel may result in local tone maps determined based on pixel statistics associated with a current image frame not yet being available when image pixels in the current image frame are to be modified. Thus, in such embodiments, the pixel contrast control controller may determine local tone maps based at least in part on pixel statistics associated with the current image frame while the pixel contrast control processing circuitry applies local tone maps that are determined based at least in part on pixel statistics associated with a previous image frame.

For example, based at least in part on the global luma histogram associated the previous image frame and local luma histograms associated with the current image frame, the pixel contrast control controller may determine one or more local tone maps for each local window (e.g., of the first set) to be applied by the pixel contrast control processing circuitry to modify a next image frame. In particular, the one or more local tone maps determined for a local window may be associated with a pixel position located in (e.g., at the center of) the local window. In some embodiments, a set of local tone maps may be spatially filtered to facilitate reducing likelihood of producing unintended sudden brightness changes in an image frame, which, at least in some instances, may facilitate improving perceived image quality.

To facilitate further improving perceived image quality, in some embodiments, successive sets of local tone maps may be temporally filtered to facilitate reducing likelihood of producing unintended sudden brightness changes in successive image frames. However, since successive image frames included in different scenes are generally significantly different, applying temporal filtering across a scene boundary may result in an incorrect image frame. To reduce likelihood of perceiving such incorrect image frames, temporal filtering of successive sets of local tone maps may be disabled when a scene change is detected.

In some embodiments, the pixel contrast control block may detect that a scene change has occurred between a first image frame and a second image frame based at least in part on scene change statistics (e.g., largest maximum color component value and average maximum color component value) associated with each local window (e.g., of the second set) in the second image frame, for example, relative to scene change statistics associated with the first image frame. As such, the scene change may not be detected until after the pixel contrast control block has completed determination of pixel statistics associated with the second image frame and, thus, after the pixel statistics associated with the second image frame have already been used to determine local tone maps to be applied in the next image frame. While temporally filtered local tone maps may nevertheless be applied in the second image frame, likelihood of producing perceivable visual artifacts may be reduced by applying local tone maps generated with temporal filtering disabled in the next image frame.

To enable such an implementation, the pixel contrast control controller may determine multiple versions of each local tone map. For example, the pixel contrast control controller may determine a first version with temporal filtering enabled and a second version with temporal filtering disabled. In this manner, the pixel contrast control processing circuitry may selectively apply either the first version of the local tone maps or the second version of the local tone maps based at least in part on whether a scene change has been detected.

Moreover, in some embodiments, the pixel contrast control controller may facilitate reducing power consumption by opportunistically dimming (e.g., reducing) the brightness of a backlight, if equipped, for example in a liquid crystal display (LCD). For example, to reduce the power consumption by the backlight unit, the pixel values may be increased while decreasing (i.e., dimming) the backlight level. As such, the same visual luminance may be provided while maintaining a dimmed backlight level. In some embodiments, the dimming factor applied to the backlight level may be temporally filtered (e.g., via a moving average) to facilitate reducing likelihood of producing sudden brightness changes. For example, target luminance of an image frame may be determined based on luminance of a previous image frame and a dimming ratio applied two image frames prior. In this manner, as will be described in more detail below, the techniques described in the present disclosure provide technical benefits that facilitate reducing power consumption and/or improving perceived image quality of electronic displays.

To help illustrate, an electronic device 10, which includes an electronic display 12, is shown in FIG. 1. As will be described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

In the depicted embodiment, the electronic device 10 includes the electronic display 12, one or more input devices 14, one or more input/output (I/O) ports 16, a processor core complex 18 having one or more processor(s) or processor cores, local memory 20, a main memory storage device 22, a network interface 24, a power source 26, and image processing circuitry 27. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. Additionally, the image processing circuitry 27 (e.g., a graphics processing unit) may be included in the processor core complex 18.

As depicted, the processor core complex 18 is operably coupled with local memory 20 and the main memory storage device 22. Thus, the processor core complex 18 may execute instruction stored in local memory 20 and/or the main memory storage device 22 to perform operations, such as generating and/or transmitting image data. As such, the processor core complex 18 may include one or more general purpose microprocessors, one or more application specific integrated circuits (ASICs), one or more field programmable logic arrays (FPGAs), or any combination thereof.

In addition to instructions, the local memory 20 and/or the main memory storage device 22 may store data to be processed by the processor core complex 18. Thus, in some embodiments, the local memory 20 and/or the main memory storage device 22 may include one or more tangible, non-transitory, computer-readable mediums. For example, the local memory 20 may include random access memory (RAM) and the main memory storage device 22 may include read only memory (ROM), rewritable non-volatile memory such as flash memory, hard drives, optical discs, and/or the like.

As depicted, the processor core complex 18 is also operably coupled with the network interface 24. In some embodiments, the network interface 24 may facilitate communicating data with another electronic device and/or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, and/or a wide area network (WAN), such as a 4G or LTE cellular network.

Additionally, as depicted, the processor core complex 18 is operably coupled to the power source 26. In some embodiments, the power source 26 may provide electrical power to one or more component in the electronic device 10, such as the processor core complex 18 and/or the electronic display 12. Thus, the power source 26 may include any suitable source of energy, such as a rechargeable lithium polymer (Li-poly) battery and/or an alternating current (AC) power converter.

Furthermore, as depicted, the processor core complex 18 is operably coupled with the one or more I/O ports 16. In some embodiments, I/O ports 16 may enable the electronic device 10 to interface with other electronic devices. For example, when a portable storage device is connected, the I/O port 16 may enable the processor core complex 18 to communicate data with the portable storage device.

As depicted, the electronic device 10 is also operably coupled with the one or more input devices 14. In some embodiments, an input device 14 may facilitate user interaction with the electronic device 10, for example, by receiving user inputs. Thus, an input device 14 may include a button, a keyboard, a mouse, a trackpad, and/or the like. Additionally, in some embodiments, an input device 14 may include touch-sensing components in the electronic display 12. In such embodiments, the touch sensing components may receive user inputs by detecting occurrence and/or position of an object touching the surface of the electronic display 12.

In addition to enabling user inputs, the electronic display 12 may include a display panel with one or more display pixels. As described above, the electronic display 12 may control light emission from its display pixels to present visual representations of information, such as a graphical user interface (GUI) of an operating system, an application interface, a still image, or video content, by displaying frames based at least in part on corresponding image data (e.g., image pixel located at the same pixel position). As depicted, the electronic display 12 is operably coupled to the processor core complex 18 and the image processing circuitry 27. In this manner, the electronic display 12 may display images based at least in part on image data generated by the processor core complex 18, the image processing circuitry 27. Additionally or alternatively, the electronic display 12 may display images based at least in part on image data received via the network interface 24, an input device 14, and/or an I/O port 16.

Figure 2:
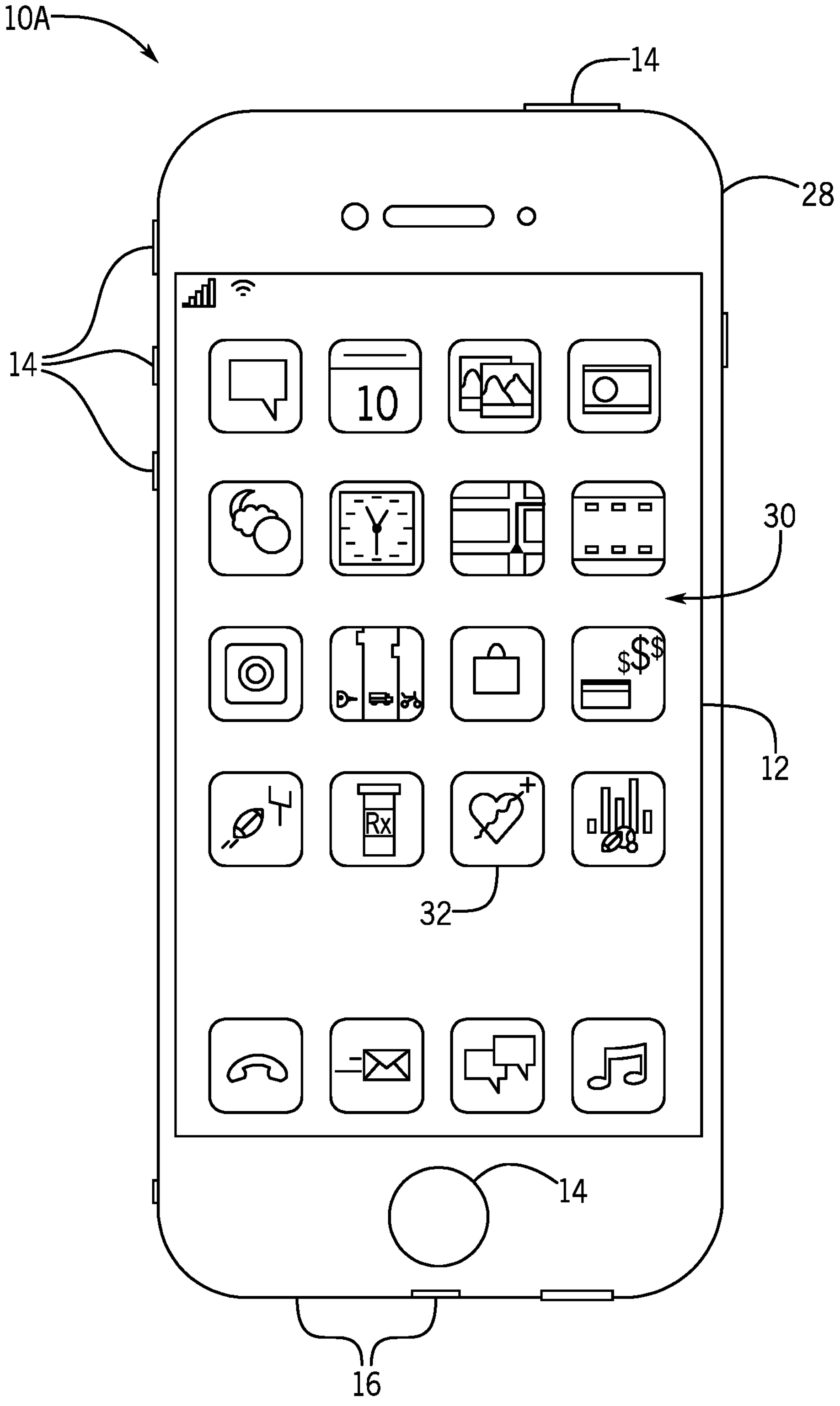
FIG. 2 is an example of the electronic device of FIG. 1, in accordance with an embodiment.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electromagnetic interference. Additionally, as depicted, the enclosure may 28 surround the electronic display 12. In the depicted embodiment, the electronic display 12 is displaying a graphical user interface (GUI) 30 having an array of icons 32. By way of example, when an icon 32 is selected either by an input device 14 or a touch-sensing component of the electronic display 12, an application program may launch.

Furthermore, as depicted, input devices 14 may be accessed through openings in the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 may be accessed through openings in the enclosure 28. In some embodiments, the I/O ports 16 may include, for example, an audio jack to connect to external devices.

Figure 3:
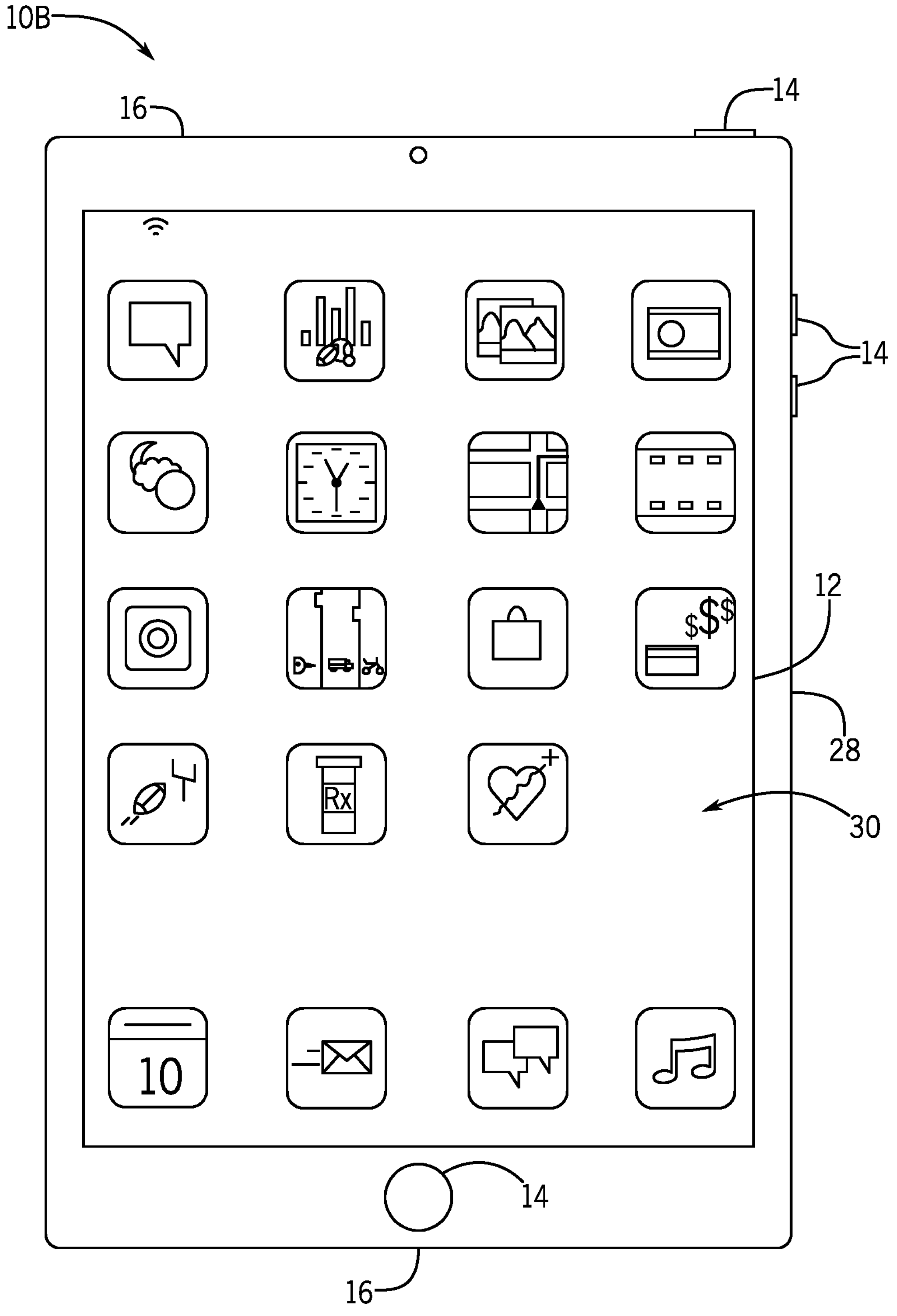
FIG. 3 is another example of the electronic device of FIG. 1, in accordance with an embodiment.
Figure 4:
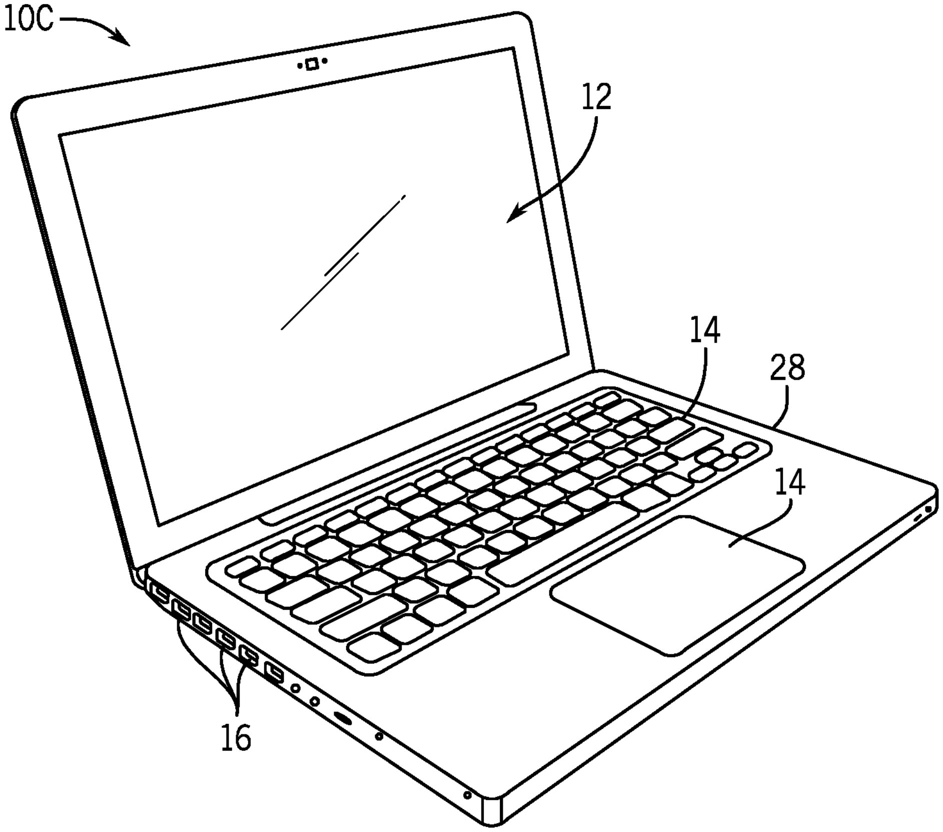
FIG. 4 is another example of the electronic device of FIG. 1, in accordance with an embodiment.
Figure 5:
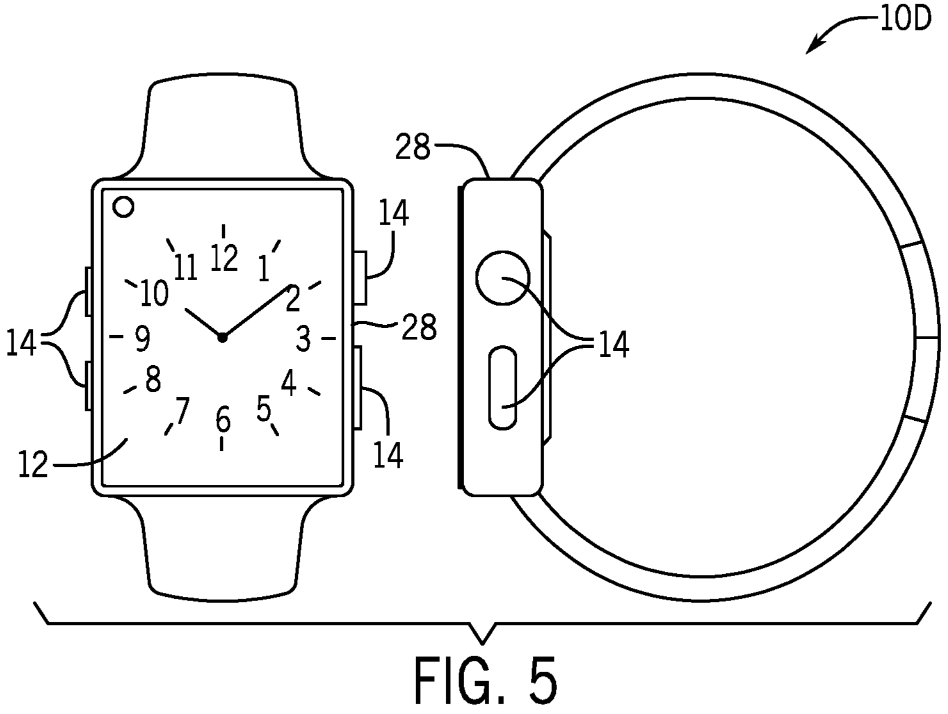
FIG. 5 is another example of the electronic device of FIG. 1, in accordance with an embodiment.

To further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 28.

Figure 6:
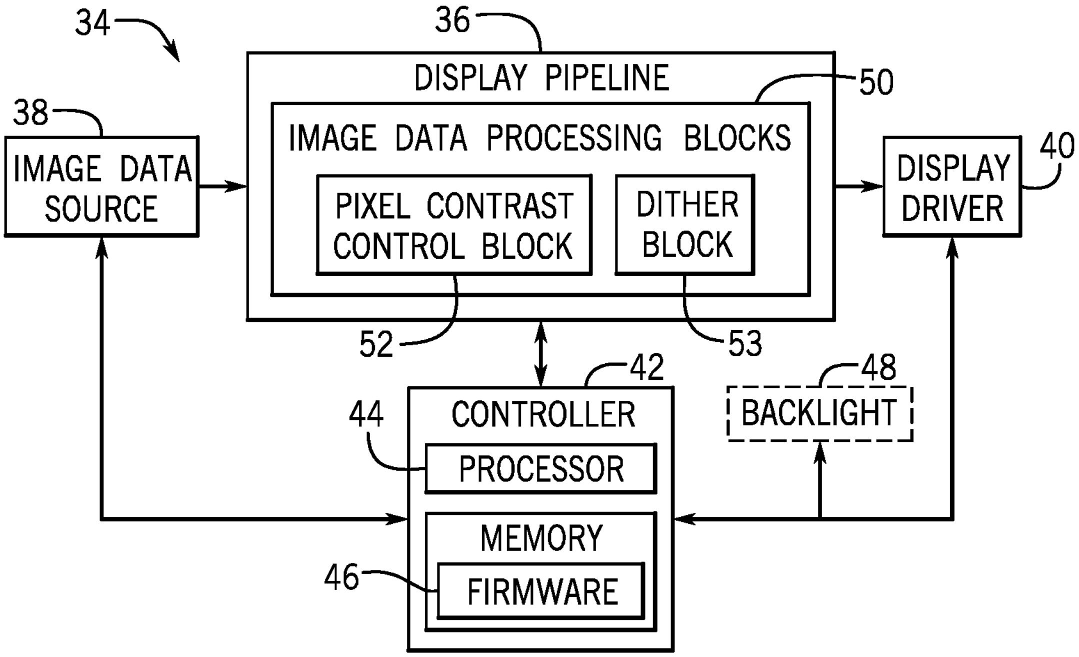
FIG. 6 is a block diagram of a display pipeline coupled between an image data source and a display driver included in the electronic device of FIG. 1, in accordance with an embodiment.

As described above, an electronic display 12 may display images (e.g., image frames) based on image data received, for example, from the processor core complex 18 and/or the image processing circuitry 27. To help illustrate, a portion 34 of the electronic device 10 including a display pipeline 36 that operationally retrieves, processes, and outputs image data is shown in FIG. 6. In some embodiments, a display pipeline 36 may analyze and/or process image data obtained from an image data source 38, for example, to determine and apply tone curves to the image data before the image data is used to display corresponding images. Additionally, in some embodiments, a display driver 40 may generate and supply analog electrical signals to the display pixels to display an image based at least in part on image data received from the display pipeline 36.

In some embodiments, the display pipeline 36 and/or the display driver 40 may be implemented in the electronic device 10, the electronic display 12, or a combination thereof. For example, the display pipeline 36 may be included in the processor core complex 18, the image processing circuitry 27, a timing controller (TCON) in the electronic display 12, one or more other processing units or circuitry, or any combination thereof. Additionally, a controller 42 may be implemented to synchronize and/or supplement processing of the image data received from the image data source 38. Such a controller may include a processor 44 and/or memory 46, and may be implemented as separate circuitry or integrated into other components. For example, as with the display pipeline 36, the controller 42 may be implemented in the electronic device 10, such as in the processor core complex 18, the image processing circuitry 27, one or more other processing units or circuitry, or any combination thereof.

In some embodiments, image data may be stored in a source buffer in the image data source 38 and fetched by the display pipeline 36. In some instances, an electronic device 10 may include one or more processing pipelines (e.g., display pipeline 36) implemented to process image data. To facilitate communication between processing pipelines, image data may be stored in the image data source 38, external from the processing pipelines. In such instances, a processing pipeline, such as the display pipeline 36, may include a direct memory access (DMA) block that reads (e.g., retrieves) and/or writes (e.g., stores) image data in the image data source 38 (e.g., memory 46, main memory storage device 22, and/or local memory).

The controller 42 and the display driver 40 may also be operatively coupled to a backlight 48, if present in the electronic display 12. In some embodiments, for example such as an electronic devices 10 using a liquid crystal display (LCD), a backlight 48 is included to provide a static or variable light source that acts a light source for the display pixels and, thus, viewing of images. However, in some displays 12, an alternate light source other than a backlight 48 may be used. For example, organic light emitting diode (OLED) displays may have self-emissive display pixels. Furthermore, some embodiments may include more than one light source, such as self-emissive pixels and a backlight 48.

When retrieved (e.g., fetched) from the image data source 38 by the display pipeline 36, image data may be formatted in the source space. The source space may include file formats and/or coding native to the image data source 38. To facilitate display of corresponding images on an electronic display, the display pipeline 36 may map the image data from the source space to a display space used by the electronic display 12. Different types, models, sizes, and resolution displays may have different display spaces.

Additionally, the display pipeline 36 may include one or more image data processing blocks 50 that perform various image processing operations, for example, to map the image data from the source space to the display space. In the depicted embodiment, the image data processing blocks 50 include a pixel contrast control (PCC) block 52 and a dither block 53. In some embodiments, the image data processing blocks 50 may additionally or alternatively include a color management block, a blend block, a crop block, and/or the like. In some embodiments, a display pipeline 36 may include more, less, combined, split, and/or reordered image data processing blocks 50.

The dither block 53 may assist in smoothing pixel colors and intensities globally and/or locally. These adjustments may assist in compensating for quantization error. For example, a display may not be able to achieve the full color pallet of the image data. Instead of rounding or estimating to the nearest color, the dither block 53 may intertwine colors of the display's color pallet amongst localized pixels to approximate the original image data and provide a more aesthetic, clear, and/or sharp output for viewing. Additionally or alternatively, the dither block 53 may also provide temporal dithering which may alternate colors and/or light intensities on different images to yield an appearance of a targeted (e.g., desired) color.

Based on the characteristics of the display space image data and environmental conditions, such as ambient lighting, the PCC block 52 may analyze image data from the current and/or previous frames and apply local tone maps. In some embodiments, the local tone maps may adjust the color and brightness levels of pixels based on image data characteristics and environmental factors.

Figure 7:
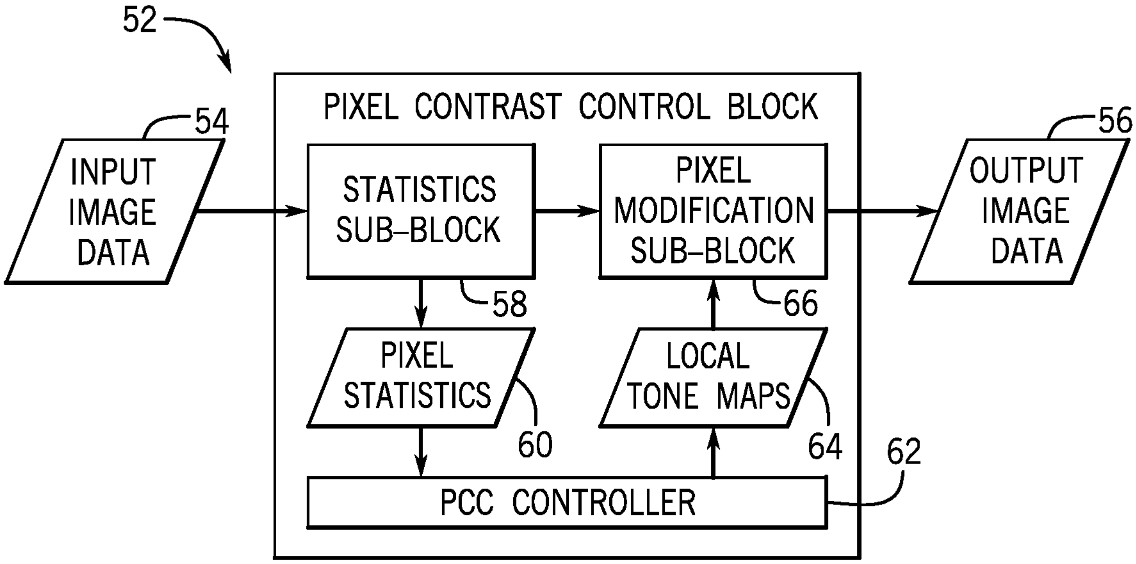
FIG. 7 is a block diagram of a pixel contrast control block included in the display pipeline of FIG. 6, in accordance with an embodiment.

To help illustrate, FIG. 7 is a block diagram of the PCC block 52 receiving input image data 54 and producing output image data 56. The input image data 54 of the upcoming frame may be analyzed by a statistics sub-block 58 to obtain pixel statistics 60. These pixel statistics 60 may include minimums, maximums, averages, histograms, and/or other information indicative of content of the input image data 54. Additionally, pixel statistics 60 may be determined globally and/or locally. The pixel statistics 60 may be processed by a PCC controller 62 to determine local tone maps 64 to adjust the image input data 54 in the pixel modification sub-block 66. Output image data 56 may then be further processed and/or sent to the display driver 40.

In some embodiments the PCC block 52 may be divided into more than one processing sections. For example, the statistics sub-block 58 and the pixel modification sub-block 66 may be implemented by pixel contrast control processing circuitry (e.g., hardware) and the PCC controller 62 may be implemented a processor that executes instructions (e.g., firmware) stored in a tangible, non-transitory, computer-readable medium. In some embodiments, the PCC controller 62 may include a dedicated processor or microprocessor. Additionally or alternatively, the PCC controller 62 may share processing resources with the controller 42, processor core complex 18, or the like.

In some embodiments, the statistics sub-block 58 may communicate an interrupt signal to the PCC controller 62 when pixel statistics 60 are available for processing. Additionally, after determining the local tone maps 64 based at least in part on the pixel statistics 60, the PCC controller 62 may store the local tone maps 64 in registers accessible by the pixel modification sub-block 66. Additionally, to facilitate synchronizing operation the PCC controller 62 may indicate to the pixel modification sub-block 66 that the local tone maps 64 have been updated and ready to be applied.

Figure 8:
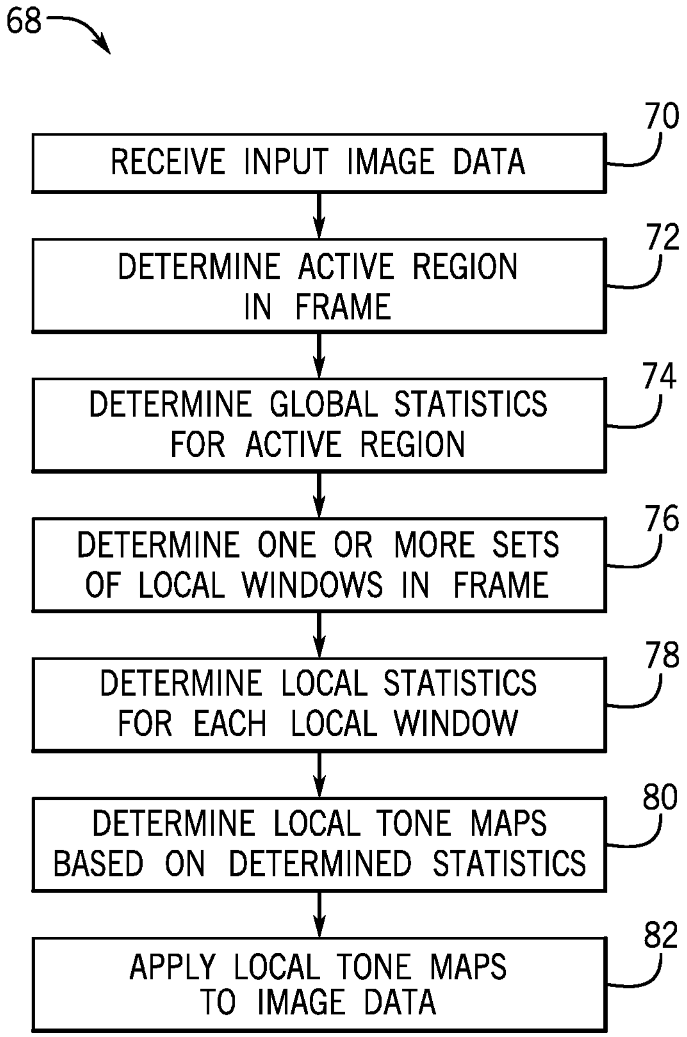
FIG. 8 is a flowchart of a process for operating the pixel contrast control block of FIG. 7, in accordance with an embodiment.

FIG. 8 is a flow diagram 68 illustrating an overview of the operation of the PCC block 52. The PCC block 52 receives input image data 54 for a frame (process block 70) and determines one or more active regions in the frame (process block 72). The active region(s) may be areas of the frame that are desired to be considered for controlling perceived contrast. The statistics sub-block 58 of the PCC block 52 may then determine global statistics for the active region (process block 74). One or more sets of local windows of the frame may also be determined (process block 76) such that local statistics for each local window may be determined (process block 78). From the global and local statistics, local tone maps 64 may then be determined (process block 80) and applied to the input image data 54 (process block 82).

Figure 9:
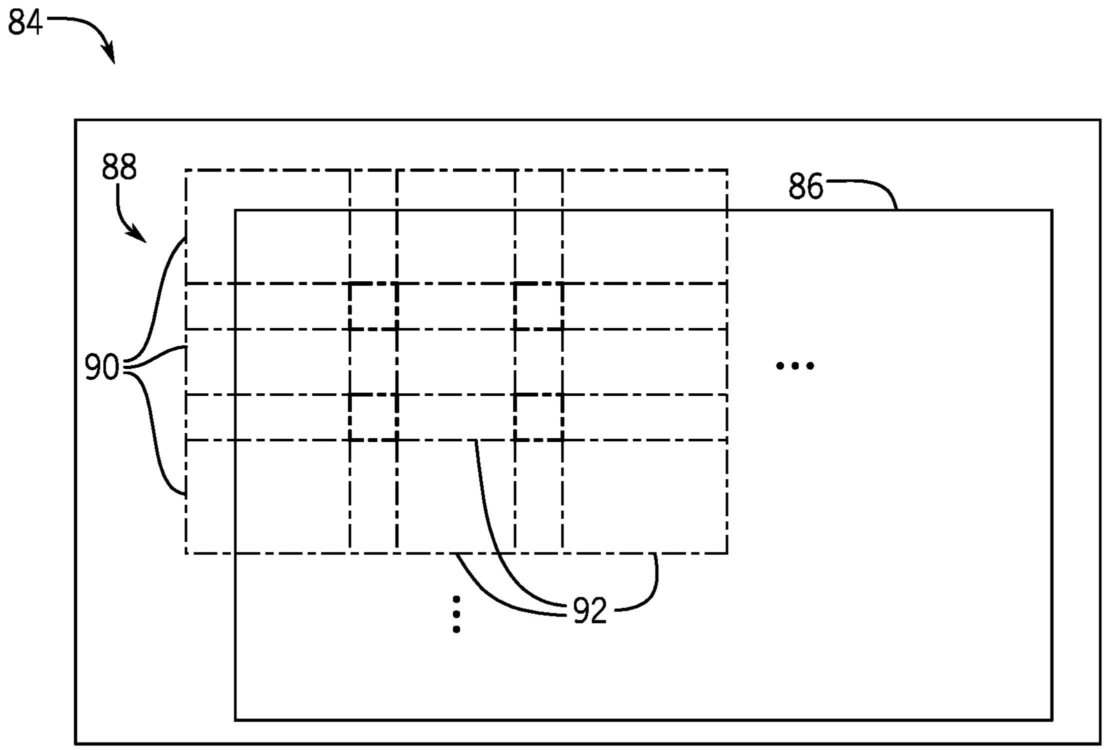
FIG. 9 is a diagrammatic representation of an example image frame, in accordance with an embodiment.

To help illustrate, FIG. 9 is an example image frame 84 of the input image data 54 in which an active region 86 is defined. As stated above, the active region 86 may be an area of the image frame 84 that is to include PCC processing separately from the rest of the image frame 84. For example, active regions 86 may exclude or be separated from areas of the image frame 84 that including subtitles, constant color sections (e.g., letterboxes), and/or the like. Additionally, an active region 86 may include a portion of the image frame 84 separated via picture-in-pictures or split-screen. In some embodiments, the active region 86 may include the full image frame 84.

In any case, one or more sets of local windows 88 may be defined based at least in part on the active region 85. For example, a first set may be defined to completely enclose the active region 86. In fact, in some embodiments, the first set may include edge windows 90 that encompass portions of the image frame 84 outside the active region 86. Although pixel statistics 60 are to be drawn from the portion of the edge windows 90 within the active region 86, in some embodiments, pixel statistics 60 may nevertheless be gathered from outside the active region 86.

Additionally or alternatively, a second set may be defined such that it is completely enclosed within the active region 86. In some embodiments, the local windows 88 included in the second set may be used to facilitate detecting occurrence of scene changes. Additionally, in some embodiments, the local windows 88 included in the second set may differ from the local windows 88 included in the first set, for example, such that they are aligned and/or offset differently. In other embodiments, a single set of local windows 88 may be used.

Figure 10:
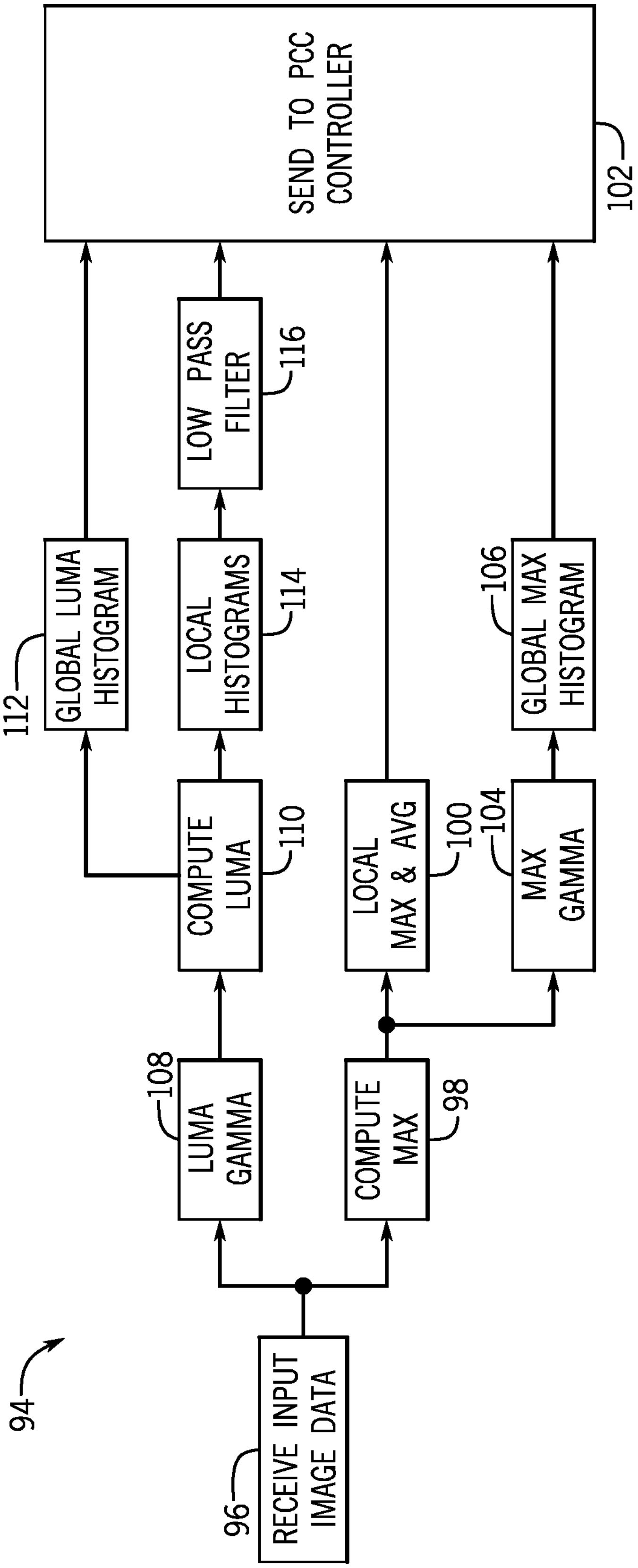
FIG. 10 is flowchart of a process for determining pixel statistics, in accordance with an embodiment.

As stated above, local and global statistics may be determine by the statistics sub-block 58. Additionally, both local and global statistics may include maxima, averages, histograms, and/or other desired pixel statistics 60. FIG. 10 is a block diagram 94 outlining an example of a process for determining pixel statistics 60. Input image data 54 may be received by the statistics sub-block 58 (process block 96). The input image data 54 may image pixels that each indicates target luminance of each color components (e.g., red, green, and blue) located at a corresponding display pixel.

In finding one set of pixel statistics 60, the maximum intensity level of the color components for each pixel is determined (process block 98). Each pixel's maximum intensity level may be from any of the color components (e.g., red, green, or blue) and used to produce both local and global statistics. The maximum intensity levels of each pixel in a local window 88 may be used to find the overall maximum intensity level as well as an average intensity level among the maximum, average maximum (process block 100). As stated above, the determined pixel statistics 60 are then sent to the PCC controller 62 for computation of local tone maps 64 (process block 102). In some embodiments, each maximum intensity level may be encoded into a maximum gamma value for the corresponding pixel (process block 104). This encoding may transform the color component intensity levels into a non-linear space to increase perceptible differences to the human eye. Whether using the maximum intensity levels or maximum gamma values a global histogram of the maxima may be created (process block 106), and sent to the PCC controller 62 (process block 102).

Additionally or alternatively, the color component intensities of the full input image data 54 may be encoded into gamma values before gathering further statistics (process block 108). The gamma values, or color component intensities if encoding is not desired, may also be used to determine luma values for each image pixel (process block 110). Luma values may correspond to the luminance or light emission of a corresponding display pixel. As such, correction coefficients may be used for different color components.

In some embodiments, a maximum luma value of the different color components and/or an average luma value among the different color components of each image pixel may be computed. Furthermore, a mixture of maximum and average luma values may also computed to smooth transitions between light and dark temporally and/or spatially. In some embodiments a floor value may be established for the average luma values and/or the mixed luma values to maintain at least a minimum luma level. These maximum luma values, average luma values, and mixed luma values may be used to calculate global histograms, throughout the active region 86 (process block 112) and/or local histograms, among each of the local windows 88 (process block 114). Additionally, in some embodiments, a filter, (e.g., low-pass) may be applied to one or more histograms (e.g., local histograms) to facilitate smoothing spatial outliers (process block 116) before being sent to the PCC controller 62 (process block 102).

As stated above, the average, maximum, and/or mixed luma values may be used by the PCC controller 62 to generate local tone maps 64. In some instances, the input image data 54 may include highly saturated colors. While having a high color content, the light output of highly saturated colors may not be very high.

Figure 11:
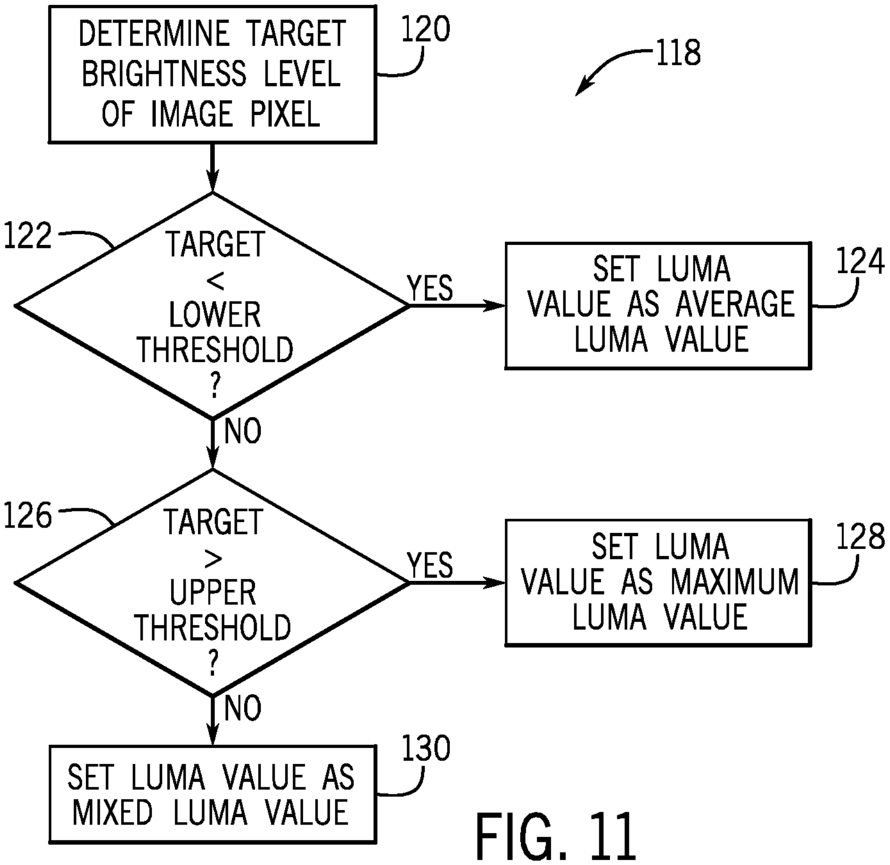
FIG. 11 is a flowchart of a process for determining a luma value associated with an image pixel, in accordance with an embodiment.

FIG. 11 is a flowchart 118 to help illustrate choosing which luma value to use. A target brightness level of a pixel, local window 88, or active region 86 may be determined (process block 120). This target brightness level may be determined based on the desired light output of a pixel, local window 88, or active region 86. As such, the luma value for each image pixel may be chosen individually, grouped by local window 88, grouped by active region 86, or together as an image frame 84. If the target brightness is less than a lower threshold (decision block 122), then the luma value may be set as the average luma value (process block 124). If the target brightness is greater than an upper threshold (decision block 126), then the luma value may be set as the maximum luma value (process block 128). Furthermore, if the target brightness level is between the thresholds, the luma value may be set to the mixed luma value. In some embodiments, it may be desirable to use the maximum luma values instead of the mixed or average luma values when generating local tone maps 64, since using a maximum luma value may reduce color component changes. However, average and/or mixed luma values may yield a boost in grey level, thereby preserving perceived contrast by making relatively more changes to the color component intensities.

Figure 12:
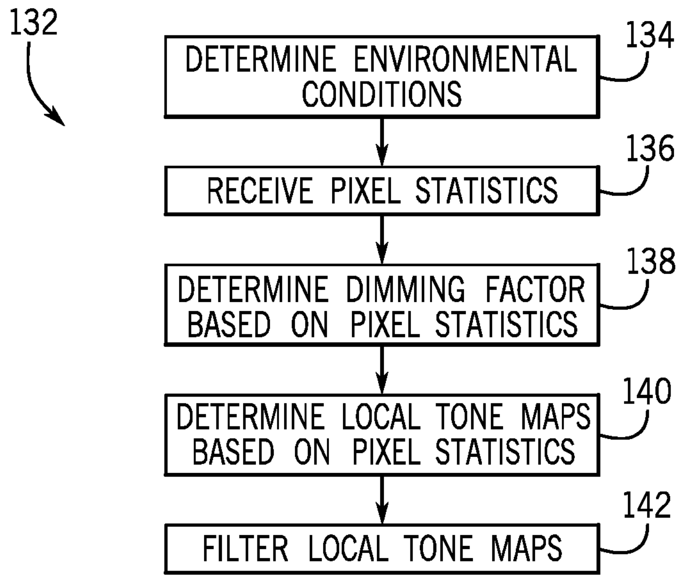
FIG. 12 is a flowchart of a process for operating a controller implemented in the pixel contrast control block of FIG. 7, in accordance with an embodiment.

Once received, the PCC controller 62 may generate local tone maps 64 based at least in part on the pixel statistics 60. FIG. 12 is a flowchart 132 illustrating the creation of local tone maps 64. The PCC controller 62 may determine environmental conditions (e.g., ambient lighting) to factor into the local tone maps 64 (process block 134). The PCC controller 62 also receives the pixel statistics 60 from the statistics sub-block 58 (process block 136). From the environmental conditions and pixel statistics 60 (e.g., global maximum histogram, global luma histogram, local histograms, etc.), the PCC controller 62 may determine a dimming factor (process block 138) and tone maps (process block 140). In some embodiments, the local tone maps 64 may be filtered, for example by using a low-pass filter, to facilitate smoothing color component and light output intensities (process block 142). These local tone maps 64 may then be sent to the pixel modification sub-block 66 for application to the input image data 54. Local tone maps 64 may be applied per pixel or via local windows 88 and/or active regions 86. Additionally, in some embodiments, the dimming factor may be used to affect the backlight 48 of the electronic display 12, if equipped, or the current and/or voltage levels to self-emissive display pixels. A further temporal filter may be applied to such lighting effects to reduce the likelihood of sudden lighting changes.

To produce the local tone maps 64, the PCC controller 62 may employ temporal and/or spatial filters. For example, temporal filters may allow for smooth light output changes (e.g., backlight 48 changes) as well as color component factor changes. Additionally, temporal filters may allow for smooth tone curve changes over time. In some embodiments, a temporal filter may use pixel statistics 60 from one or more previous frames. However, due to the effects of temporal filtering, if a scene change occurs, artifacts and/or undesired changes in color or lighting effects may occur if the temporal filtering is not reset. Scene change identification may be done as part of a pixel statistic (e.g., global statistic) analysis. For example, if the global histogram of the input image data 54 is significantly different from that of the previous frame, a scene change may have occurred.

Returning now to FIG. 7, as stated above, the statistics sub-block 58 provides the pixel statistics 60 to the PCC controller 62 to generate the local tone maps 64. In some embodiments, the PCC block 52 may collect the pixel statistics 60 and interpolate the output image data 54 simultaneously. As such, this may lead to the use local tone maps 64 determined based on pixel statistics 60 associated with a previous frame to image data corresponding with the current frame. The temporal filters may facilitate smoothing any differences between frames 84. However, a scene change may not be detected until the subsequent frame. As such, when a scene change occurs, this frame delay may be compounded with the above mentioned artifacts or undesired color and/or lighting effect changes due to temporal filtering. As temporal filtering may be accomplished over multiple frames, it may take multiple frames to correct the issues that arise.

To minimize the effects of a scene change, two sets of tone maps may be generated by the PCC controller 62. One set of local tone maps 64 may include temporal filtering from previous frames 84, while a second set of local tone maps 64 may have the temporal filters reset, thereby not taking previous frames 84 into account. While temporally filtered local tone maps 64 may nevertheless be applied, when a scene change is detected, the likelihood of producing perceivable visual artifacts may be reduced by applying local tone maps 64 without temporal filtering. This may result in the single frame delay artifacts as outlined above without added delay due to temporal filtering. In some embodiments, faster processing may reduce the frame delay further. Furthermore, in general, a single frame outlier may be acceptable when perceived by the human eye depending on implementation (e.g., frame rate).

Figure 13:
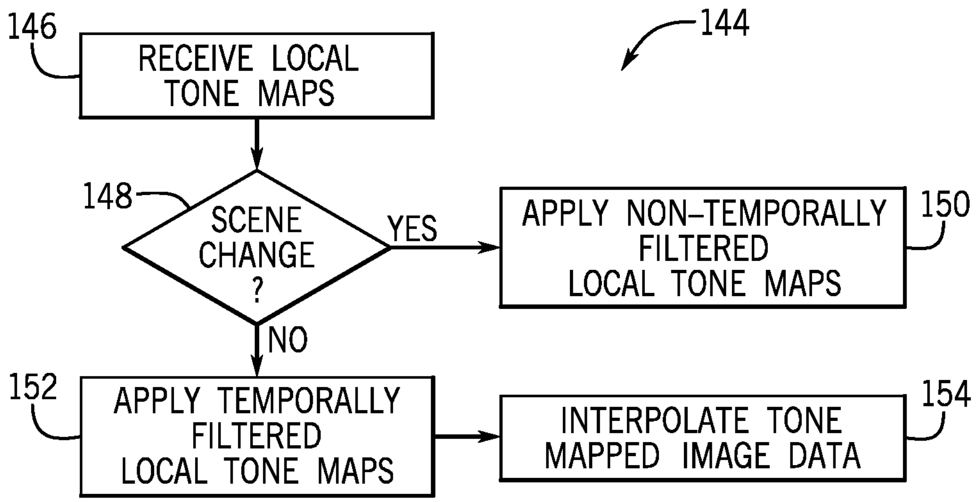
FIG. 13 is a flowchart of a process for operating processing circuitry implemented in the pixel contrast control block of FIG. 7, in accordance with an embodiment.

To help further illustrate, FIG. 13 is a flowchart 144 showing example operation of the pixel modification sub-block 66. The pixel modification sub-block 66 may receive both temporally filtered and non-temporally filtered local tone maps 64 (process block 146). It may then be determined if a scene change has occurred (decision block 148). If a scene change has occurred, the non-temporally filtered local tone maps 64 are applied to the input image data 54 (process block 150), and temporally filtered local tone maps 64 are applied if a scene change is not detected (process block 152). In some embodiments, if a scene change is detected, a different weighting of temporally filtered tone maps 64 and/or non-temporally filtered local tone maps 64 may be applied. When applying the appropriate local tone maps 64, pixel modification sub-block 66 may interpolate the tone mapped image data (process block 154).

Figure 14:
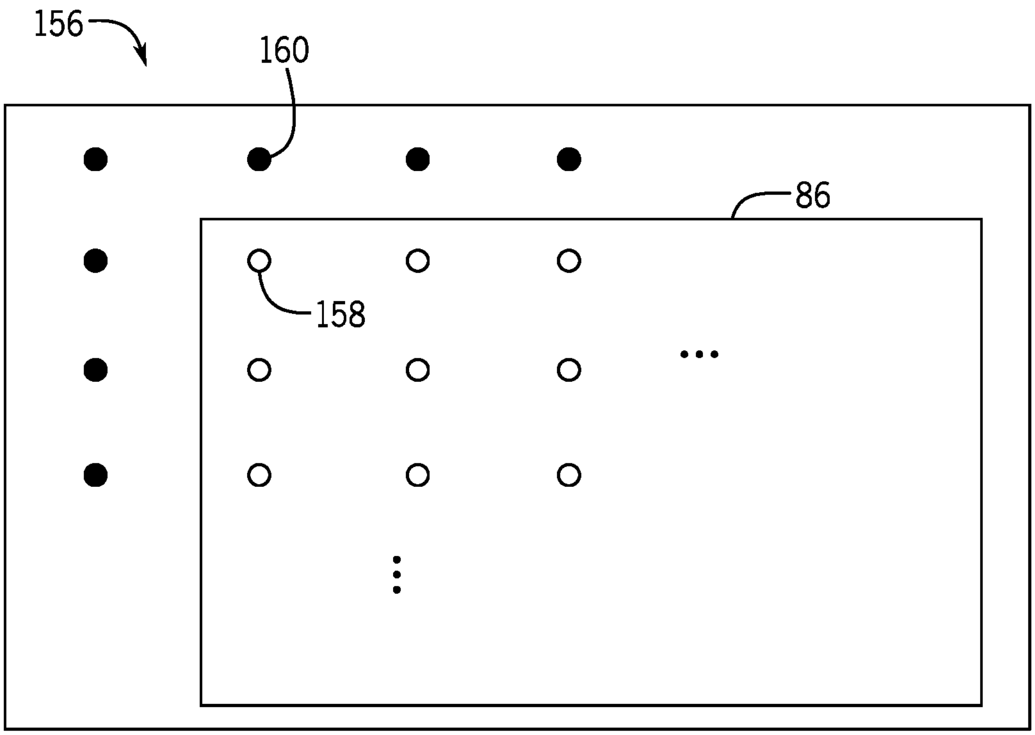
FIG. 14 is a diagrammatic representation of an example frame grid overlaid on the image frame of FIG. 9, in accordance with an embodiment.

The tone mapped image data, output image data 56, may be interpolated spatially within the active region 86 to smooth interfaces and boundaries as shown by the frame grid 156 of FIG. 14. The local tone maps 64 may be specified on a two-dimensional frame grid 156 of interior pixel positions 158, which lie within the active region 86, and exterior pixel positions 160, which lie outside the active region 86. Although the frame grid 156 need not align with the local windows 88, in some embodiments, the interior pixel position 158 correspond to the center of the local windows 88.

In any case, the pixel modification sub-block 66 may receive one or more local tone maps 64 corresponding with each interior pixel position 158. For image pixels that lie in the active region 86, one or more (e.g., four) surrounding local tone maps 64 may be applied and the results interpolated based at least in part on the distances between the local tone maps 64 to determine output image data 56. For image pixels outside the active region 86, the input image data 54 may merely be copied to the output image data 56. Similarly, if the PCC block 52 is disabled, output image data 56 may be the same as the input image data 54.

If it becomes desirable to disable the PCC block 52, a further temporal filter may be applied to the light output level in an exit phase. Because the PCC block 52 may have adjusted the light output level (e.g., backlight 48 level, self-emissive pixel level, etc.), the exit phase may slowly ramp up or down as desired to avoid sharp changes in light output level. Similarly, an entry phase may also temporally adjust the light output level to adjust the level as desired. Additionally, an entry phase may skip pixel interpolation for one or more frames until pixel statistics 60 have been collected.

When enabled, the PCC block 52 operates to increase the perceived contrast level of the frames 84 shown on the electronic display 12 while taking into account the environmental factors, such as ambient light. Depending on the type of electronic display 12 (e.g., OLED, LCD, plasma, etc.), further benefits can also be gained as well. For example, some displays 12 (e.g., LCD) may yield power savings by reducing the output level of a backlight 48 controlled separately from the pixels.

Although the above referenced flow charts are shown in a given order, in certain embodiments, decision and process blocks may be reordered, altered, deleted, and/or occur simultaneously. Additionally, the referenced flow charts are given as illustrative tools and further decision and process blocks may also be added as desired.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising a display pipeline configured to be coupled between an image data source and a display panel, wherein the display pipeline comprises:

pixel contrast control processing circuitry comprising circuit connections programmed to:

determine first pixel statistics indicative of content of a current image frame based at least in part on received image data that indicates an initial target luminance of a corresponding display pixel implemented on the display panel during the current image frame, wherein determining the first pixel statistics comprises:

determining an active region in the current image frame, wherein the active region comprises a first set of local windows;

determining a plurality of luma values, each associated with one image pixel in the current image frame;

determining a first global luma histogram based at least in part on luma values associated with each image pixel in the active region; and determining a plurality of local luma histograms each associated with a corresponding local window of the first set of local windows based at least in part on luma values associated with each image pixel in the corresponding local window; and apply a first plurality of local tone maps determined based at least in part on second pixel statistics associated with a previous image frame to determine modified image data that indicates a modified target luminance of the corresponding display pixel during the current image frame; and a pixel contrast control controller coupled to the pixel contrast control processing circuitry, wherein the pixel contrast control controller is programmed to execute firmware instructions to determine a second plurality of local tone maps to be applied during a next image frame based at least in part on the first pixel statistics received from the pixel contrast control processing circuitry.

2. The electronic device of claim 1, wherein the active region excludes portions of the current image frame which comprise subtitles, a picture-in-picture area, a constant color, or a combination thereof.

3. The electronic device of claim 2, wherein, to determine the second plurality of local tone maps, the pixel contrast control controller is programmed to:

determine a second global luma histogram associated with the previous image frame; and determine each of the second plurality of local tone maps based at least in part on the second global luma histogram and a corresponding local luma histogram of the plurality of local luma histograms associated with the current image frame.

4. The electronic device of claim 2, wherein, to determine the first pixel statistics, the pixel contrast control processing circuitry is programmed to:

determine a second set of local windows completely enclosed within the active region of the current image frame;

determine a plurality of maximum color component values each associated with one image pixel in the current image frame based at least in part on the received image data;

determine a first global maximum color component histogram based at least in part maximum color component value associated with each image pixel in the active region; and determine a first plurality of largest maximum color component values and a first plurality of average maximum color component values each associated with a second corresponding local window of the second set of local windows based at least in part on maximum color component value associated with each image pixel in the second corresponding local window.

5. The electronic device of claim 4, wherein the pixel contrast control processing circuitry is programmed to determine whether a scene change occurred between the previous image frame and the current image frame based at least in part on:

comparison between the first global maximum color component histogram associated with the current image frame and a second global maximum color component histogram associated with the previous image frame;

comparison between the first plurality of largest maximum color component values associated with the current image frame and a second plurality of largest maximum color component values associated with the previous image frame;

comparison between the first plurality of average maximum color component values associated with the current image frame and a second plurality of average maximum color component values associated with the previous image frame; or any combination thereof.

6. The electronic device of claim 1, wherein, to apply the first plurality of local tone maps, the pixel contrast control processing circuitry is programmed to:

apply a first local tone map to the received image data when the pixel contrast control processing circuitry determines that a scene change occurred directly before the previous image frame; and apply a temporally filtered tone map determined by temporally filtering the first local tone map with a second local tone map applied in the previous image frame to the received image data when the pixel contrast control processing circuitry does not determine that a scene change occurred directly before the previous image frame.

7. The electronic device of claim 1, wherein, to apply the first plurality of local tone maps, the pixel contrast control controller is programmed to:

determine a first pixel position associated with the received image data;

determine a first local tone map of the first plurality of local tone maps associated with a second pixel position;

apply the first local tone map to the received image data determine a first result;

determine a second local tone map of the first plurality of local tone maps associated with a third pixel position;

apply the second local tone map to the received image data to determine a second result; and determine the modified image data based at least in part on interpolation of the first result and the second result based at least in part on a first distance between the first pixel position and the second pixel position and a second distance between the first pixel position and the third pixel position.

8. The electronic device of claim 7, wherein, to apply the first plurality of local tone maps, the pixel contrast control controller is programmed to:

determine a third local tone map of the first plurality of local tone maps associated with a third pixel position;

apply the third local tone map to the received image data determine a third result;

determine a fourth local tone map of the first plurality of local tone maps associated with a fourth pixel position;

apply the fourth local tone map to the received image data to determine a fourth result; and determine the modified image data by:

interpolating the first result and the second result based at least in part on a first distance between the first pixel position and the second pixel position and a second distance between the first pixel position and the third pixel position to determine a first intermediate result;

interpolating the third result and the fourth result based at least in part on a third distance between the first pixel position and the third pixel position and a fourth distance between the first pixel position and the fourth pixel position to determine a second intermediate result; and interpolating the first intermediate result and the second intermediate result.

9. The electronic device of claim 1, wherein the electronic device comprises a portable phone, a media player, a personal data organizer, a handheld game platform, a tablet device, a computer, or any combination thereof.

10. A method for processing image data to adjust perceived contrast, a light output level, or a combination thereof of an electronic display comprising:

receiving, via a pixel contrast control block of an electronic device, the image data;

determining, via the pixel contrast control block, pixel statistics from the image data, wherein the pixel statistics comprise a luma level for at least one pixel, wherein the luma level for the at least one pixel is selected from one of an average luma level, a maximum luma level, and a mixed luma level based at least in part on a value of a target brightness relative to a first brightness threshold and a second brightness threshold, wherein the mixed luma level comprises a combination of the maximum luma level and the average luma level for the at least one pixel;

determining, via the pixel contrast control block, one or more tone maps, at least in part, from the pixel statistics;

applying the one or more tone maps to the image data; and outputting, via the pixel contrast control block, the image data with the one or more tone maps applied to an electronic display.

11. The method of claim 10, comprising determining, via the pixel contrast control block, a dimming factor, wherein the dimming factor is configured to set the light output level of a light source of the electronic display.

12. The method of claim 11, wherein the dimming factor is temporally filtered to smooth changes in the light output level.

13. The method of claim 10, wherein the one or more tone maps are determined, at least in part, on environmental factors, wherein the environmental factors comprise an ambient lighting condition.

14. The method of claim 10, wherein at least a portion of the pixel statistics is processed through a low-pass filter to smooth spatial outliers of the image data.

15. A method for processing image data to increase perceived contrast on an electronic display comprising:

determining, via a pixel contrast control block of an electronic device, pixel statistics from the image data;

determining, via the pixel contrast control block, a first set of tone maps based, at least in part, on the pixel statistics, wherein the first set of tone maps is temporally filtered;

determining, via the pixel contrast control block, a second set of tone maps based, at least in part, on the pixel statistics, wherein the second set of tone maps is not temporally filtered; and applying, via the pixel contrast control block, either the first set of tone maps or the second set of tone maps to the image data.

16. The method of claim 15, comprising, in response to determining a scene change from the pixel statistics, applying the second set of tone maps.

17. The method of claim 15, wherein determining the pixel statistics comprises converting the image data to a non-linear gamma space.

18. The method of claim 15, wherein the first set of tone maps or the second set of tone maps are applied to the image data over a frame grid.

19. The method of claim 18, wherein an interpolation of the first set of tone maps or the second set of tone maps is applied to each of a plurality of pixels based at least in part on a location of each of the plurality of pixels.

20. The method of claim 10, wherein:

the second brightness threshold is greater than the first brightness threshold;

the selected luma level comprises the average luma level in response to the value of the target brightness being less than the first brightness threshold;

the selected luma level comprises the mixed luma level in response to the value of the target brightness being between the first brightness threshold and the second brightness threshold; and the selected luma level comprises the maximum luma level in response to the value of the target brightness being greater than the second brightness threshold.

* * * * *